United States Patent [19]
Schaefer

[11] 3,820,001
[45] June 25, 1974

[54] TRANSISTOR POWER CONVERTER

[76] Inventor: Jan Van Valkenburg Schaefer, 2345 Seabreeze Dr., San Diego, Calif. 92139

[22] Filed: Feb. 28, 1972

[21] Appl. No.: 229,804

[52] U.S. Cl.......................... 321/2, 321/46, 331/117
[51] Int. Cl.......................................... H02m, H03b
[58] Field of Search...... 321/2, 46; 331/112, 113 A, 331/117

[56] References Cited
UNITED STATES PATENTS

| | | | |
|---|---|---|---|
| 2,881,380 | 4/1959 | Krüger | 321/2 |
| 3,098,202 | 7/1963 | Nenell et al. | 331/117 X |
| 3,383,624 | 5/1968 | Fiala | 321/2 X |
| 3,681,674 | 8/1972 | Terry | 321/2 |

FOREIGN PATENTS OR APPLICATIONS

| 1,254,327 | 1/1961 | France | 321/2 |
|---|---|---|---|

Primary Examiner—William H. Beha, Jr.

[57] ABSTRACT

A transistor power converter is described which may be used to convert a given direct current voltage to a higher direct current voltage. Transistor oscillator circuits are explained and illustrated which accomplish the desired power conversion. These circuits have certain advantages including low cost, small size, high efficiency, and low standby power requirements, that is, power is consumed by these power converters only when required by the electrical loads. Some of these circuits may be manufactured with as few as four electrical components. Specific examples of workable circuits are given.

3 Claims, 2 Drawing Figures

TRANSISTOR POWER CONVERTER

This invention relates to a transistor power converter and more particularly to a transistor oscillator power converter which operates from an electrical energy source having a given voltage and provides a different voltage for an electrical load.

The advantages of the use of transistors in power converters are well known and include low cost, long service life, high efficiency and small size.

Transistor power converters are presently used to supply power for a variety of electrical loads from electrical energy sources which can not be used to operate these electrical loads directly. Electrical loads of this type include electrical appliances which are designed to operate from 120 volt alternating current or 120 volt direct current and may be operated from storage batteries of the type generally found in automobiles by means of power converters. These power converters thereby allow operation of electric appliances including electric shavers, electric lamps, and electric tools where commercially generated and distributed electric power is not readily available. Other uses for present day power converters include the operation of electronic apparatus including sound recording devices and radio receivers. Although batteries may be manufactured with sufficiently high voltage for operation of electronic apparatus without requiring power converters, these batteries must contain many cells and are therefore expensive to manufacture. Furthermore, high voltage batteries present particular problems with respect to recharging.

Although power coverters manufactured according to present practice are useful for many purposes, they have disadvantages regarding their excessive power consumption, generation of acoustic and electrical noise and slow response to changes in voltages of the electrical energy sources from which they operate. Furthermore present day transistor power converters generally contain complex and expensive transformers and large capacitors which limit their usefulness for many purposes. Excessive power consumption by power converters is a particularly serious problem because many electrical loads operate intermittently and therefore do not require power from the power converters at certain-times However these power converters must continue to operate and consume power during these times so that power will be available to the electrical loads when required. It is therefore clear that power consumption by power converters when power is not required by the electrical load represents wasted power. Power converters manufactured according to present day practice produce spurious acoustic noise or spurious electrical noise or both acoustic noise and electrical noise. Acoustic noise is frequently undesirable because it may be annoying to the person using the power converter or because the noise might interfere with the normal operation of apparatus for which the power converter is required. Apparatus which may be adversely affected by noise includes sound recording apparatus which may not operate satisfactorily with a power converter which generates audible acoustic noise because the noise may be introduced into the microphone associated with the sound recording apparatus. Other types of electronic apparatus which may be adversely affected by noise generated by power converters include radio receivers. Radio receivers may not operate properly if they are used with power converters which generate electrical noise signals having frequencies to which the radio receivers may respond. Power converters manufactured according to present day practice generally respond slowly to changes in voltages of the electrical energy sources from which they operate. This slow response is frequently undesirable because many modern electrical devices are capable of high speed operation but operate most satisfactorily with voltages different from the voltages supplied by readily available electrical energy sources. These devices could therfore be used more advantageously if power converters having fast response could be provided.

An object of this invention is a transistor oscillator power converter which operates with a minimum of wasted power.

Another object of this invention is a transistor oscillator power converter which generates no undesirable acoustic noise.

Still another object of this invention is a transistor oscillator power converter which generates no undesirable electrical noise.

Still another object of this invention is a transistor oscillator power converter which responds rapidly to changes in voltage of the electrical energy source from which this invention operates.

Still another object of this invention is a transistor oscillator power converter which may be designed and manufactured with relatively few components which are small in size and inexpensive.

A feature of this invention is provided which allows it to be permanently connected to a source of electrical energy and take negligible electrical power therefrom when an electrical load is not connected to this invention.

Another feature of this invention allows it to be controlled by a source of potential which supplies sufficient transistor bias current which is required by this invention.

The foregoing and other objects and features will be understood from the following description in which specific embodiments are disclosed in detail.

This invention consists of a transistor oscillator power converter including a transistor base circuit and a transistor collector circuit. The term transistor base circuit is used here to identify parts of the embodiment which allow electric current to flow between the transistor base electrode and transistor emitter electrode. The term transistor collector circuit is used here to identify parts of the embodiment which allow electric current to flow between the transistor collector electrode and transistor emitter electrode.

In this invention electric current taken from an electrical energy source and interaction of electric currents in the transistor base and collector circuits cause high frequency electric oscillation which produce an electric voltage suitable for an electrical load. The voltage thus produced is similar in waveform and frequency to the voltage of the electrical energy source. The electrical energy source may be but is not restricted to a direct current electrical energy source. In this case the voltage supplied by this invention for an electrical load will be direct current voltage. The voltage produced for an electrical load by this invention is obtained by rectification of the high frequency electrical oscillations. Therefore the waveform and frequency of the voltage of the electrical energy source must consist of frequencies lower than the high frequency electric oscillation which occur in this invention.

Figure 1:
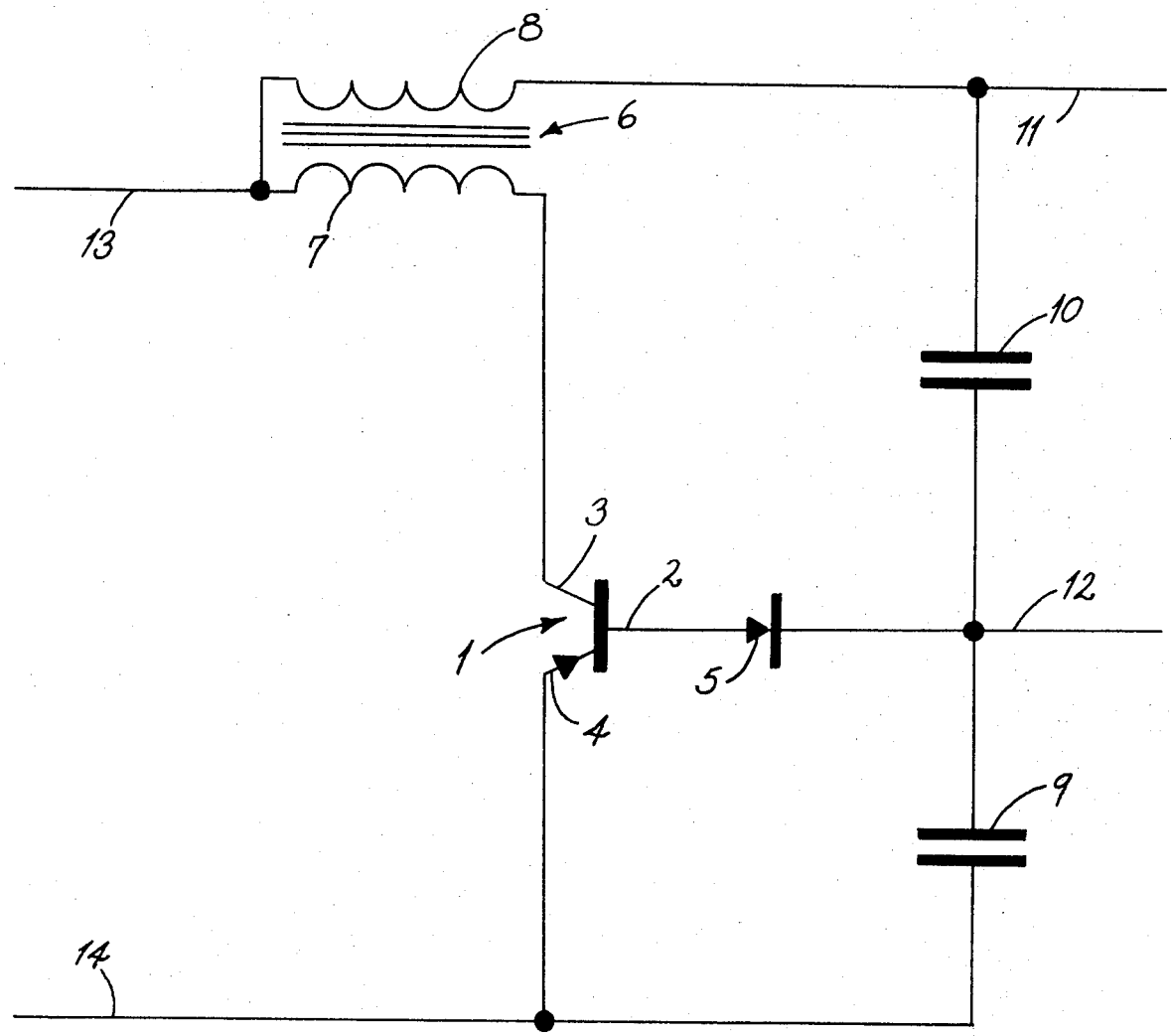
FIG. 1 is a circuit diagram of a transistor oscillator power converter having a single transistor in accordance with this invention.

Refering now in detail to the drawings, in FIG. 1 is shown a transistor 1 having a base electrode 2, a collector electrode 3 and an emitter electrode 4. Rectifier means 5 is included to rectify the high frequency oscillations which occur in the embodiment. Transformer 6 has a primary winding 7 and a secondary winding 8. Tuning capacity means 9 is used to resonate transformer 6 and thereby determine the frequency of oscillation which is also dependent on transformer 6. Capacitor 10 is a bypass capacitor which prevents the oscillations in the embodiment from appearing at the electrical load which is connected in parallel with bypass capacitor 10 by conductor means 11 and 12. Conductor means 13 and 14 are for connection of an electrical energy source to the embodiment.

If the electrical energy source is connected to the embodiment by conductor means 13 and 14, collector voltage is thereby supplied to transistor 1 through transformer primary winding 7. This collector voltage will cause collector current to flow in transistor 1. Changes in this collector current will cause transformer 8 to produce a similarly changing voltage across tuning capacity means 9 and changes in the base current of transistor 1 therefrom. Because of turns ratio of the windings of transformer 6 and the direction of the currents in the windings of transformer 6, the voltage across tuning capacity means 9 has the required polarity and amplitude to allow the embodiment shown in FIG. 1 to oscillate with a frequency determined primarily by the inductance of transformer secondary 8 and the capacity of tuning capacity means 9. However sustained oscillations will not occur unless bias current for transistor 1 is provided. In the embodiment shown in FIG. 1 bias current is supplied by the electrical energy source conducted through transformer secondary winding 8 and through the electrical load connected to conductor means 11 and 12.

Rectifier means 5 is operative to cause current conduction by transistor 1 for only part of each cycle of the oscillations. It is therefore apparent that current will be conducted by rectifier means 5 which is an average value of the rectified current conducted by secondary winding 8. It will be appreciated from the foregoing that the average current must be conducted by the electrical load which is connected to conductor means 11 and 12. In the embodiment shown in FIG. 1, the voltage across the electrical load as measured between conductors 11 12 is larely independent of the resistance of the electrical load. It will be appreciated that changes in resistance of the electrical load are operative to cause changes in the transistor base current and therefore operative to maintain the voltage across the electrical load at a constant value.

The following components have been used to construct a workable device in accordance with FIG. 1 which is described here for example only.

The transistor 1 may be a germanium alloy type which includes rectifier means 5 by the inherent rectification property of the transistor.

The transformer 6 may consist of a ferromagnetic core with secondary winding 8 having ten times the number of turns as primary winding 7.

The bypass capacitor 10 may have ten times the capacity of tuning capacity means 9.

The electrical load connected to conductor means 11 and 12 may be resistive with a resistance greater than two thousand ohms.

The electrical energy source may be an electrochemical battery cell supply a voltage of 1.0 volt connected to conductor means 13 and 14 such that conductor 13 is negative with respect to conductor 14.

With these components the direct current voltage supplied to the electrical load will be approximately 9 volts as measured between conductors 11 and 12. The efficiency will be at least 50 percent. With the electrical load disconnected the current taken from the electrochemical cell will be quite small, on the order of 20 microamperes. With these components models have been constructed having oscillation frequencies as low as 1 kilohertz and as high as 500 kilohertz and efficiencies higher than 50 percent.

It will be apparent to those persons sufficiently skilled in the art that tuning capacity means 9 may be provided by the wiring capacity of transformer 6 and the input capacity of transistor 1 and stray wiring capacity. It will also be apparent that bias current for transistor 1 may be supplied by any source of potential which provides sufficient base current for transistor 1 to cause sustained oscillations.

Figure 2:
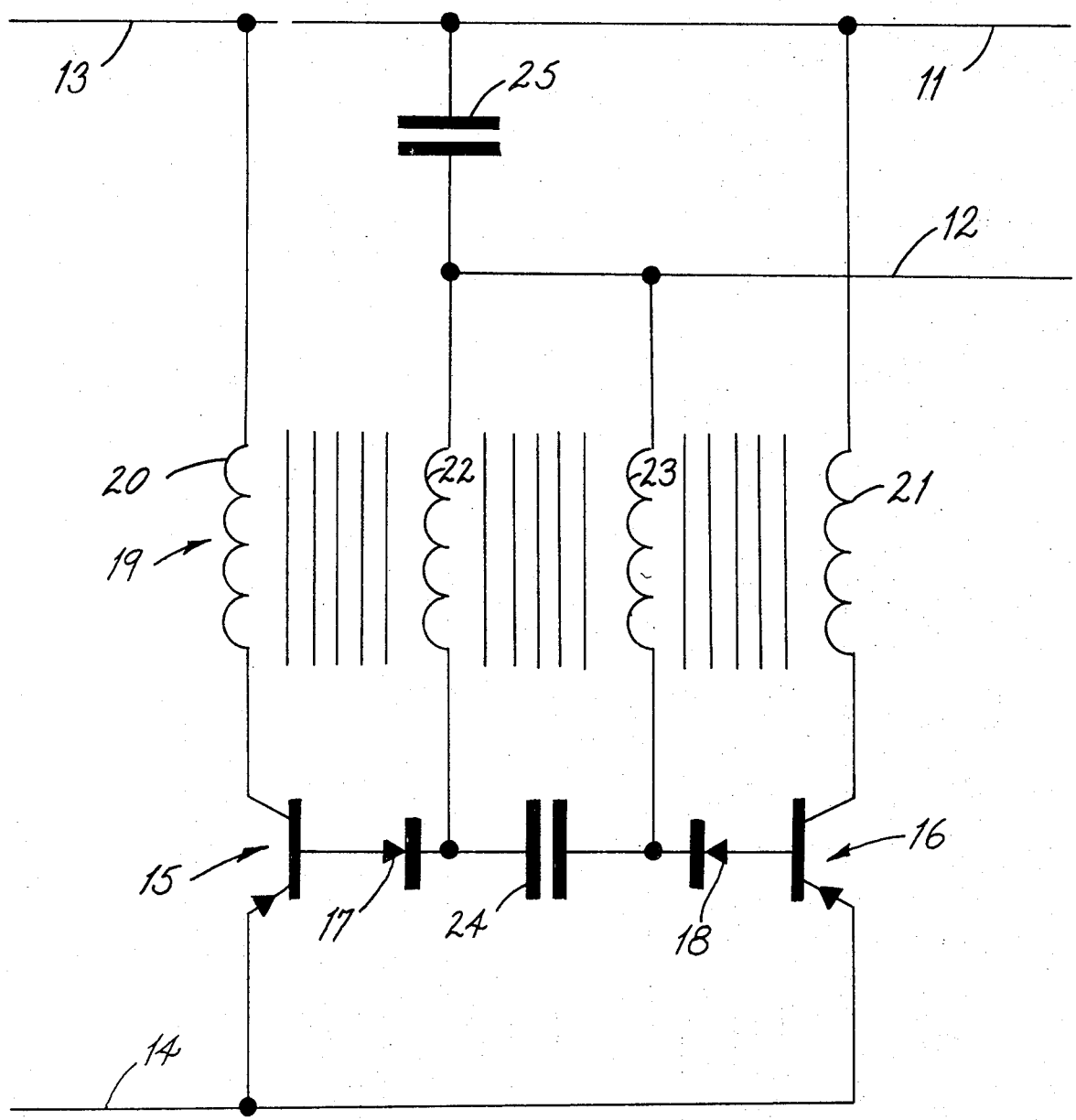
FIG. 2 is a circuit diagram of a transistor oscillator power converter having two transistors forming a transistor oscillator in accordance with this invention.

FIG. 2 is another embodiment of this invention having two transistors 15 and 16. Rectifier means 17 and 18 are included for rectification of the electric oscillations which occur in the embodiment. Transformer 19 has primary winding 20 included in the collector circuit of transistor 15, secondary winding 22 included in the base circuit of transistor 15, primary winding 21 included on the collector circuit of transistor 16 and secondary winding 23 included in the base circuit of transistor 16. Tuning capacity means 24 is used to resonate transformer 19 and thereby determine the frequency of oscillation which is also dependent on transformer 19. Bypass capacitor 25 which is common to the base circuits of both transistors 15 and 16 prevents the oscillations from the embodiment shown in FIG. 2 from appearing at the electrical load which is connected in parallel with bypass capacitor 25 by conductor means 11 and 12. Conductor means 13 and 14 are included for connection of an electrical energy source to the collector circuits of transistors 15 and 16. Bias means for transistors 15 and 16 is provided by current supplied by the electrical energy source by conductor means 13 and 14 and then through the electrical load by conductor means 11 and 12. Part of this bias current is conducted by transformer secondary winding 22 and then through rectifier means 17 to transistor 15. Another part of this bias current is coducted by transformer secondary winding 23 and then through rectifier means 18 to transistor 16.

It will be appreciated that current oscillation will occur in transistors 15 and 16 and will be interdependent because transformer 19 has a primary winding positioned in each collector circuit and a secondary winding positioned in each base circuit and these windings are coupled by the ferromagnetic core of transformer 19. It will also be appreciated that the current conducted to the electrical load connected to conductor means 11 and 12 will include the average value of the sum of the rectified currents produced by rectifier means 17 and 18.

The following components have been used to construct a workable device according to the embodiment shown in FIG. 2 which is described here for example only.

The transistors 15 and 16 may be type 2N976.

The rectifier means 17 and 18 may be type 1N916 semiconductor recifier.

The transformer 19 may be constructed having the following characteristics.

The initial reluctance of the ferromagnetic transformer core at 1 megahertz may be 1.87 per inch. The core loss factor at 10 megahertz may be 0.000085. Each of the two primary windings 19 and 20 may consist of 4 turns of size number 24 wire. Each of the two secondary windings 22 and 23 may consist of 40 turns of size number 34 wire.

The tuning capacity means for resonating transformer 24 may consist of the winding capacity of transformer 19 and the input capacities of transistors 15 and 16 and stray wiring capacities.

The bias means may be provided by current conduction from the electrical energy source connected to conductor means 13 and 14 and then through the electrical load connected to conductor means 11 and 12 whereby bias means is provided for transistor 15 by current conduction through transformer secondary winding 22 and rectifier means 17 and bias means is provided for transistor 16 by current conduction through transformer secondary winding 23 and rectifier means 18.

The bypass capacitor 25 which is common to the base circuits of both transistors 15 and 16 may have a capacity of 0.01 microfarad.

The electrical load which is connected to conductors 11 and 12 may be resistive having a direct current resistance of 2,000 ohms.

The electrical energy source which is connected to conductor means 13 and 14 may include an electrochemical cell which supplies a direct current voltage of 1.3 volts and a direct current of 65 miliamperes and which is connected such that conductor 13 is negative with respect to conductor 14. The electrical energy source may also include a capacitor having a capacity of .05 microfarads which is connected in parallel with the electrochemical cell.

The directions of currents is the transformer windings 20, 21, 22 and 23 may be arranged such that current oscillations in transistors 15 and 16 occur in the embodiment shown in FIG. 2 in a push pull manner.

With these components the voltage at the electrical load was found to be a direct current voltage of 10 volts which was measured between conductors 11 and 12. The frequency of oscillation of currents in transistors 15 and 16 was found to be 3 megahertz. The electrical efficiency which was determined by calculation of the power supplied to the electrical load and the power taken from the electrical energy source was found to be 58 percent. When the electrical load was disconnected the current taken by the embodiment shown in FIG. 2 was found to be quite small, on the order of 12 microamperes direct current. The maximum flux density in the ferromagnetic core was found to be lower than 200 gauss. It will be appreciated by those persons sufficiently skilled in the art that a flux density of 200 gauss is much lower than the saturation flux density of generally available ferromagnetic materials. It will furthermore be appreciated that low flux densities are desirable because they result in low transformer core losses and therefore contribute to high efficiency. Furthermore low flux densities allow construction of transformers of the type described in the foregoing example in accordance with FIG. 2 having small size, on the order of one eighth of one cubic inch.

It is apparent from the foregoing descriptions that this invention does not require excessive power consumption because it may be constructed in a form having high electrical efficiency and because it takes only a small amount of power from the electrical energy source when the electrical load is not connected.

It is also apparent that this invention may be constructed in a form which operates at a frequency which does not cause undesirable acoustic or electrical noise to be generated. Furthermore this invention may be constructed in a form which includes a plurality of transistors which operate in a push pull manner which further reduces the electrical noise generated by this invention.

It is furthermore apparent that this invention may operate at a high frequency which will allow it to respond to changes in voltage of the electrical energy source from which this invention takes power.

it is furthermore apparent that this invention may be constructed using relatively few components in a form which operates a high frequency and with high efficiency whereby small and inexpensive components may be used for the manufacture of this invention.

It is furthermore apparent that this invention will operate and take power from an electrical energy source only if bias means is provided and that bias means may include an electrical load and a source of electrical energy. The bias means may also include any source of potential not included in this invention.

It will be understood that this invention is not limited to the exact form described but may be modified within the scope of this present invention as defined in the following claims.

I claim:

1. A transistor oscillator power converter for use with an electrical energy source and an electrical load, said power converter including in combination:

a plurality of transistors, each of said plurality of transistors having a base electrode, a collector circuit and a base circuit.

a transformer having a ferromagnetic core, a primary winding positioned in each said collector circuit, and a secondary winding positioned in each said base circuit, whereby a plurality of base circuits is provided, each of said plurality of base circuits including a transistor base electrode and secondary winding, tuning capacity means operative to cause oscillatory electric currents in each said base circuit, bypass capacitor means positioned in parallel with the electrical load, bias means operative to cause sustained oscillatory electric currents in each said base circuit, rectifier means operative to cause rectification of said oscillatory electric currents whereby an average value of rectified current is conducted by said rectifier means and by the electrical load,
substantially all of said average value of rectified current being conducted by said plurality of base circuits.

2. A transistor oscillator power converter as set forth in claim 1 in which the oscillatory electric currents in said plurality of transistors occur in a push pull manner.

3. A transistor oscillator power converter as set forth in claim 1 in which the frequency of oscillation of currents in said plurality of transistors is at least as high as 500 kilohertz.

* * * * *

UNITED STATES PATENT AND TRADEMARK OFFICE
CERTIFICATE OF CORRECTION

PATENT NO. : 3,820,001
DATED : June 25, 1974
INVENTOR(S) : Jan Van Valkenburg Schaefer It is certified that error appears in the above-identified patent and that said Letters Patent are hereby corrected as shown below:

In column 3, line 59, "conductors 11 12" should be -- conductors 11 and 12 --.

In column 5, line 19, " primary windings 19 and 20" should be -- primary windings 20 and 21 --; in column 5, line 24, "transformer 24" should be -- transformer 19--; in column 5, line 52, "is" should be --in --.

In column 6, line 33, "a" should be -- at a --.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks